(12) United States Patent
Yin-Feng

(10) Patent No.: US 8,894,339 B2
(45) Date of Patent: *Nov. 25, 2014

(54) VARIABLY THREADED SCREW

(75) Inventor: Liu Yin-Feng, Taipei (TW)

(73) Assignee: Simpson Strong-Tie Company, Inc., Pleasanton, CA (US)

( * ) Notice: Subject to any disclaimer, the term of this patent is extended or adjusted under 35 U.S.C. 154(b) by 220 days.

This patent is subject to a terminal disclaimer.

(21) Appl. No.: 12/142,082

(22) Filed: Jun. 19, 2008

(65) Prior Publication Data

US 2008/0273939 A1 Nov. 6, 2008

Related U.S. Application Data

(63) Continuation of application No. 11/292,677, filed on Dec. 2, 2005, now Pat. No. 7,402,016.

(51) Int. Cl.
*F16B 25/08* (2006.01)
*F16B 25/00* (2006.01)
*F16B 5/02* (2006.01)
*F16B 33/02* (2006.01)

(52) U.S. Cl.
CPC ........... *F16B 25/0068* (2013.01); *F16B 5/0275* (2013.01); *F16B 25/0015* (2013.01); *F16B 25/0057* (2013.01); *F16B 2033/025* (2013.01)
USPC .......................... 411/413; 411/412; 411/387.2

(58) Field of Classification Search
CPC ............. F16B 25/0015; F16B 25/0057; F16B 25/0068; F16B 2033/025
USPC .......................... 411/411–413, 378.2, 387.2; 606/315–317
See application file for complete search history.

(56) References Cited

U.S. PATENT DOCUMENTS

| 470,804 | A | | 3/1892 | Jones | |
|---|---|---|---|---|---|
| 867,552 | A | * | 10/1907 | Bradford | ........................ 301/87 |
| 2,263,137 | A | | 11/1941 | Louis | |

(Continued)

FOREIGN PATENT DOCUMENTS

| AU | 494077 | 10/1977 |
|---|---|---|
| DE | 29621922 U | 4/1998 |

(Continued)

OTHER PUBLICATIONS

International Search report and Written Opinion dated Jul. 1, 2014, in International Appl. No. PCT/US2014/031324 filed Mar. 20, 2014.

(Continued)

*Primary Examiner* — Flemming Saether
(74) *Attorney, Agent, or Firm* — Vierra Magen Marcus LLP

(57) ABSTRACT

A variably threaded screw has a first end and a second end, the first end of the shaft terminating in a tip and the second end having a widened head thereon. A first helical thread portion is located on the shaft adjacent the widened head. A second helical thread portion is located on the shaft adjacent the tip of the shaft. A third helical thread portion is located on the shaft between the first helical thread portion and the second helical thread portion. The first helical thread portion and the second helical thread portion have right hand thread pitches. The third helical thread portion has a left hand thread pitch. A helical ridge having a right hand thread pitch intersects the third helical thread portion.

18 Claims, 5 Drawing Sheets

(56) References Cited

U.S. PATENT DOCUMENTS

| | | | |
|---|---|---|---|
| 3,478,639 A | 11/1969 | Gruca | |
| 3,682,507 A | 8/1972 | Waud | |
| 4,541,270 A | 9/1985 | Hanslik | |
| 4,653,244 A | 3/1987 | Farrell | |
| 4,834,602 A * | 5/1989 | Takasaki | 411/386 |
| 4,874,278 A * | 10/1989 | Kawashita | 411/386 |
| 4,878,793 A | 11/1989 | Hewison | |
| 5,015,134 A | 5/1991 | Gotoh | |
| 5,209,753 A | 5/1993 | Biedermann et al. | |
| 5,509,370 A | 4/1996 | Kovacs et al. | |
| 5,516,248 A | 5/1996 | DeHaitre | |
| 5,536,127 A * | 7/1996 | Pennig | 411/413 |
| 5,897,280 A | 4/1999 | Dicke | |
| 5,987,837 A | 11/1999 | Nelson | |
| 6,000,892 A | 12/1999 | Takasaki | |
| 6,050,765 A | 4/2000 | McGovern et al. | |
| 6,086,303 A | 7/2000 | Fluckiger | |
| 6,109,850 A | 8/2000 | Commins | |
| 6,227,430 B1 * | 5/2001 | Rosen et al. | 228/2.1 |
| 6,328,516 B1 * | 12/2001 | Hettich | 411/387.2 |
| 6,616,391 B1 | 9/2003 | Druschel | |
| 6,644,904 B2 | 11/2003 | Chen et al. | |
| 6,666,638 B2 | 12/2003 | Craven | |
| 6,854,942 B1 | 2/2005 | Hargis | |
| 6,941,635 B2 | 9/2005 | Craven | |
| 7,037,059 B2 | 5/2006 | Dicke | |
| 7,090,453 B2 | 8/2006 | Lin | |
| 7,293,947 B2 | 11/2007 | Craven | |
| 7,402,016 B2 * | 7/2008 | Yin-Feng | 411/413 |
| 7,862,279 B2 * | 1/2011 | Stiebitz et al. | 411/387.1 |
| 2003/0026675 A1 | 2/2003 | McGovern et al. | |
| 2004/0141827 A1 | 7/2004 | Dicke | |
| 2004/0197139 A1 | 10/2004 | McGovern et al. | |
| 2006/0269380 A1 | 11/2006 | Yin-Feng | |
| 2007/0055236 A1 * | 3/2007 | Hudgins et al. | 606/61 |
| 2007/0128001 A1 | 6/2007 | Su | |
| 2007/0224019 A1 * | 9/2007 | Hale | 411/387.2 |
| 2008/0080951 A1 | 4/2008 | Lin | |
| 2009/0112269 A1 * | 4/2009 | Lieberman et al. | 606/301 |
| 2009/0162165 A1 * | 6/2009 | Chen | 411/412 |

FOREIGN PATENT DOCUMENTS

| | | |
|---|---|---|
| DE | 19846993 A1 | 4/2000 |
| DE | 202004011145 U1 | 9/2004 |
| DE | 202005006493 U1 | 6/2005 |
| DE | 202010016409 U | 2/2011 |
| EP | 1411252 A2 | 4/2004 |
| EP | 2092995 A2 | 8/2009 |
| EP | 2289647 A1 | 3/2011 |
| JP | 2002349528 A | 12/2002 |
| WO | 93/23680 | 11/1993 |

OTHER PUBLICATIONS

Schmid Schrauben Hainfeld GmbH, RAPID Komprex, retrieved from website on Sep. 14, 2013: http://www.schrauben.at/files/rapid_komprex.pdf.

DIBT, Approval communication for Reg. No. Z-9.1-564, Jul. 1, 2008.

International Search report and Written Opinion dated Oct. 2, 2013, in International Appl. No. PCT/US2013/051704 filed Jul. 23, 2013.

* cited by examiner

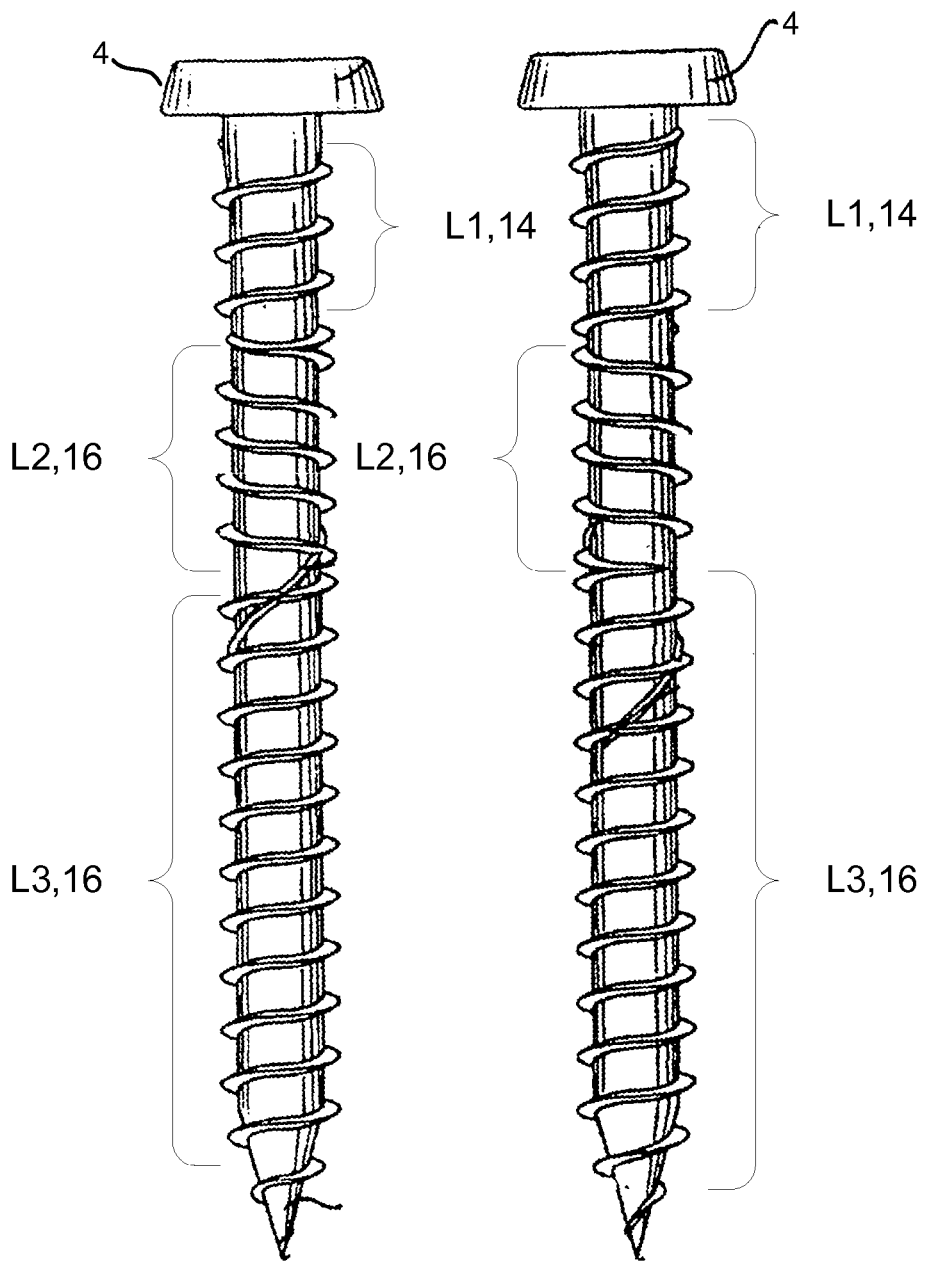
FIG. 9     FIG. 10

VARIABLY THREADED SCREW

This is a continuation of U.S. patent application Ser. No. 11/292,677 filed Dec. 2, 2005, in the name of Liu Yin-Feng, and entitled Variably Threaded Screw, which further claims the benefit of U.S. patent application Ser. No. 29/219,426, filed on Dec. 17, 2004 and Republic of China (Taiwan) Patent Application Serial No. 93212418, filed on Dec. 3, 2004.

BACKGROUND OF THE INVENTION

The subject invention generally pertains to fasteners, and more specifically to screws and the threading thereof.

U.S. Pat. No. 6,666,638 issued to Craven teaches a fastener for securing remnant-producing materials, a method of manufacturing the fastener, and a method of using the fastener so that remnants or slivers produced by rotation of the fastener are substantially embedded within the remnant-producing material. The fastener has two separate threaded portions, a first or lower threaded portion having a first thread pitch and a second or upper threaded portion having a second thread pitch. The leading lower thread portion is designed to engage the work piece more firmly than the following upper thread portion. Thus, upon insertion of the screw, as both threaded portions engage the work piece, the first section substantially maintains its position or insertion rate with respect to the work piece defined by the pitch of the lower threads. The second threaded portion having a different thread pitch engages the work piece less firmly and thus is pulled through the work piece by the first set of threads substantially at the rate defined by the angle of the first set of threads. If the respective upper and lower thread pitches were equal, the upper threads would merely follow in the tracks or parallel to the tracks of the first leading threads. By making the thread pitches different, the second threaded portion engages and pulls with it remnants and/or wall material, retaining or pulling it into the bore. The pitch of the second portion threads is less than the pitch of the threads of the first portion. The second threaded portion pitch may spiral in the same direction as the first thread portion, may be of zero pitch, i.e., one or more rings around the screw shank, or may be of negative pitch, i.e., spiral in a direction that is opposite of the threads on the first or lower threaded portion. The threads on the second or upper threaded portion have a larger diameter than the threads on the first or lower threaded portion. In use, the first or lower threaded portion of the fastener is engaged with the remnant-producing material and rotated in the direction of the threads to insert the fastener into the material. This rotation may produce remnants or slivers by extruding, cutting, or some other mechanism. These remnants may extend from the hole in the material or workpiece surface made by the screw. After the lower threaded portion is completely inserted into the material, the upper threaded portion of the fastener enters the material. Because the upper threaded portion has threads that have a different thread pitch relative to the threads on the lower threaded portion, the threads on the upper threaded portion capture the remnants that have been extruded within and/or onto the surface of the workpiece. As the fastener is completely inserted into the material, the remnants that have been extruded by the lower threaded portion of the fastener are substantially retained in the bore by the upper threaded portion of the fastener.

U.S. Pat. No. 6,616,391 issued to Druschel discloses a screw incorporating a sharp point angle, undercut head and a boring portion to contain displaced decking material below the screw head. As a result, a single-step installation produces a neatly countersunk appearance. The screw head includes a circumferential undercut connected to the top surface of the screw head by a periphery oriented parallel to the screw axis. Converging conical surfaces define the v-shaped undercut that connects the periphery of the screw head to the shank of the screw. The junction of the periphery with the radially outer conical surface of the undercut forms a peripheral lip. In an alternative embodiment, this lip may be provided with unidirectional cutting teeth that initially improve countersinking and later help prevent the screw from backing out. What would typically constitute an unthreaded portion of a deck screw (extending from the head to the threaded portion of the shank) is replaced with at least one radially projecting helical flute. The helical flute has a helical orientation opposed to that of the screw thread. The helical flute forms a boring portion that, during screw installation, pushes displaced deck material away from the surface of the decking while opening a larger diameter hole beneath the screw head. Decking material displaced by countersinking the screw head is contained beneath the head by the undercut head configuration. The material contained beneath the screw head during installation at least partially fills the hole reamed by the boring portion. A precisely defined sharp point angle and a sharp thread combine to help prevent material creep up the screw shank.

U.S. Pat. No. 6,644,904 issued to Chen et al. discloses a screw structure to be used for fastening wooden plates where the bottom end thereof can make a pointed or planar cut at a certain degree so as to reduce the friction and to enable a more efficient and smoother fastening. The aforesaid screw structure comprises a shank with a screw head at the top end and square edged threads arranged helically along the shank; wherein, between the third and the fourth threads from the bottom end of the screw, a shaft flange is positioned parallel or slanted to the longitudinal axis of the shank. When the screw is driven, the shaft flange makes a pointed or planar cut the object to be secured and thereby reduces friction. The above-mentioned screw structure positions the shaft flange between the upper and the lower rims of the third and the fourth threads. The screw structure has a shaft flange disposed at the bottom end of the shank in a convex trapezoid shape to facilitate a pointed or planar cut.

None of the above prior art teaches or suggests a screw having a thread diameter consistent along the entire shaft while including four different thread portions: first major threads (preferably eleven) at the tip end of the screw shaft, second major threads (preferably three) at the head end of the screw shaft with substantially the same thread pitch as that of the first major threads, reverse threads (preferably five) separating the first major threads and the second major threads and angled substantially opposite therefrom, and a helical ridge within the screw shaft portion that has the reverse threads (and preferably spanning three of the five reverse threads).

The above thread configuration of the screw of the subject invention functions to sever the plastic, composite or other remnant producing material with the helical ridge portion, which also serves a torque reduction function. The alternating sections consisting of first and second major threads and reverse threads contain the remnants and debris within the screw hole, while the consistent thread pitch of the first and second major thread portions and the consistent thread diameter along the entire shaft provide uniform screw fastening properties.

SUMMARY OF THE INVENTION

A variably threaded screw has a first end and a second end, the first end of the shaft terminating in a tip and the second end having a widened head thereon. A first helical thread portion is located on the shaft adjacent the widened head. A second helical thread portion is located on the shaft adjacent the tip of the shaft. A third helical thread portion is located on the shaft between the first helical thread portion and the second helical thread portion. The first helical thread portion and the second helical thread portion have right hand thread pitches. The third helical thread portion has a left hand thread pitch. A helical ridge having a right hand thread pitch intersects the third helical thread portion.

The helical ridge provides a torque reduction function and also severs the plastic, composite or other remnant producing material. The alternating right hand and left hand thread pitches of the first helical thread portion, second helical thread portion and third helical thread portion contain the remnants and debris within the screw hole.

Preferably, the first helical thread portion, second helical thread portion and third helical thread portion all have the same combined thread and shaft diameter i.e. major thread diameter (excluding the screw tip) for uniform screw fastening properties.

Preferably, the right hand thread pitch is the same for both the first helical thread portion and the second helical thread portion.

Preferably, the first helical thread portion is comprised of three threads, the second helical thread portion is comprised of eleven threads, and the third helical thread portion is comprised of five threads.

Preferably, the helical ridge intersects three threads of the third helical threaded portion.

BRIEF DESCRIPTION OF THE DRAWINGS

FIG. 9 is a third perspective view of an alternative embodiment of a variably threaded screw.
FIG. 10 is a fourth perspective view of an alternative embodiment of a variably threaded screw.

These and other subjects, features and advantages of the present invention will become more apparent in light of the following detailed description of a best mode embodiment thereof, as illustrated in the accompanying Drawings.

DETAILED DESCRIPTION OF THE PREFERRED EMBODIMENTS

The following Definitions are intended to be illustrative of, and not limiting to, the subject invention:
Major Diameter is the largest diameter of a thread.
Minor Diameter is the smallest diameter of a thread.
Pitch Diameter is the imaginary diameter where the width of the grooves equals the width of the material mass.
Pitch is the distance, measured parallel to the axis of the threads, between corresponding points on adjacent threads in the same axial plane; it is the theoretical measurement in contrast to the lead.
Lead is the axial distance moved in relation to the amount of angular rotation. It is important to distinguish between pitch and lead; uniformity of pitch does not assure uniformity of lead.
The flanks are the sides of the threads, and are the points from which the thread angle is measured.
Helix is the curvature of the forward motion of a thread, and is a trigonometric resultant of the number of threads per unit and the diameter.
A right-handed thread requires right-hand or clockwise rotation for tightening while a left-handed thread requires left hand or counterclockwise rotation.

Figure 1:
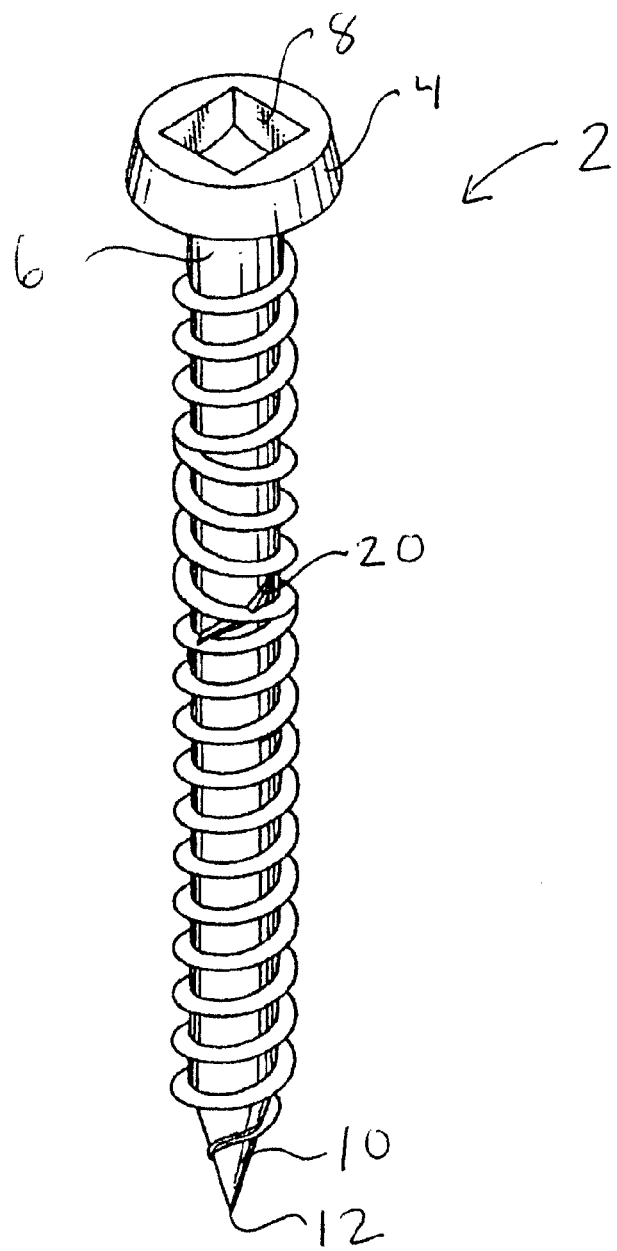
FIG. 1 is a perspective view of the variably threaded screw of the subject invention.
Figure 2:
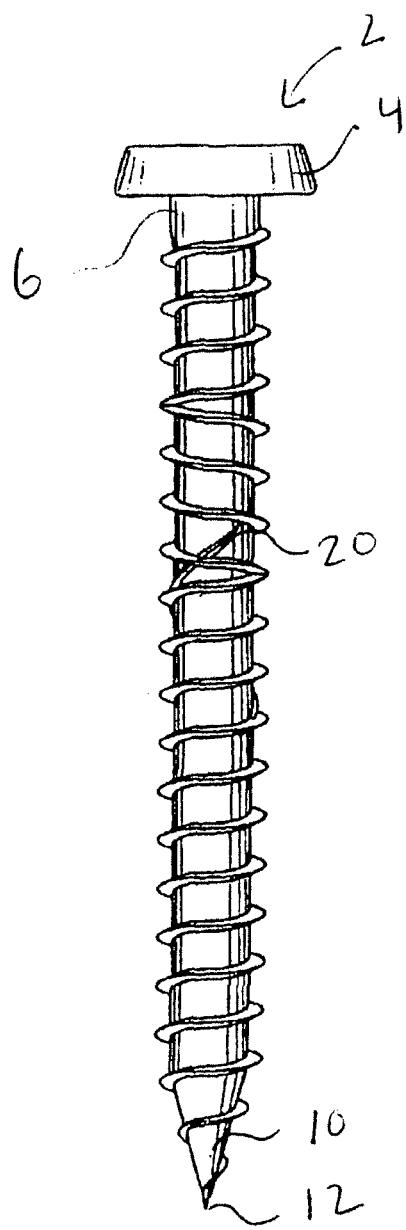
FIG. 2 is a front elevation view thereof.
Figure 3:
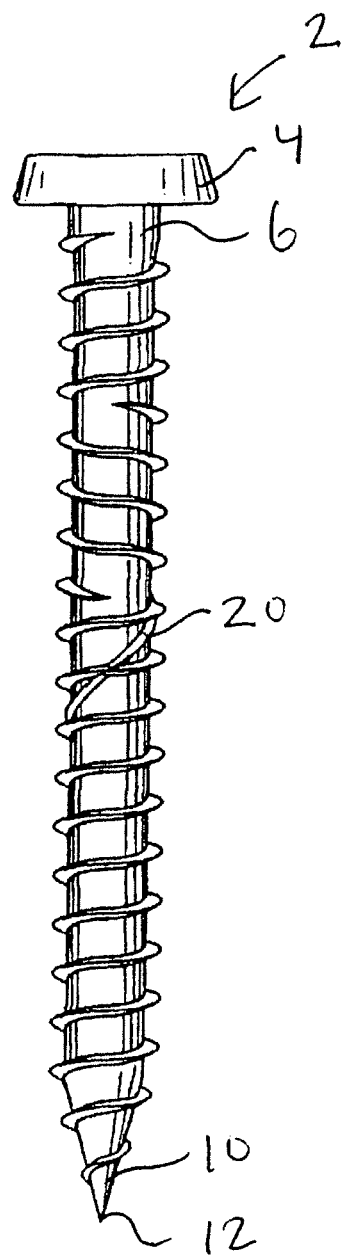
FIG. 3 is a rear elevation view thereof.
Figure 4:
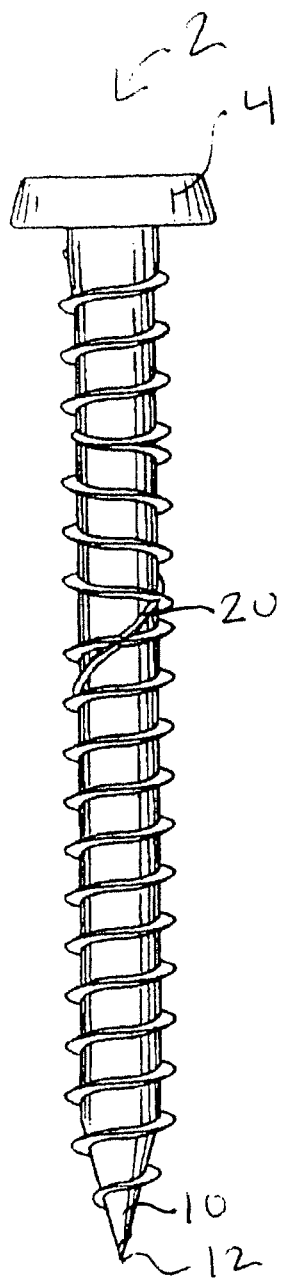
FIG. 4 is a left side elevation view thereof.
Figure 5:
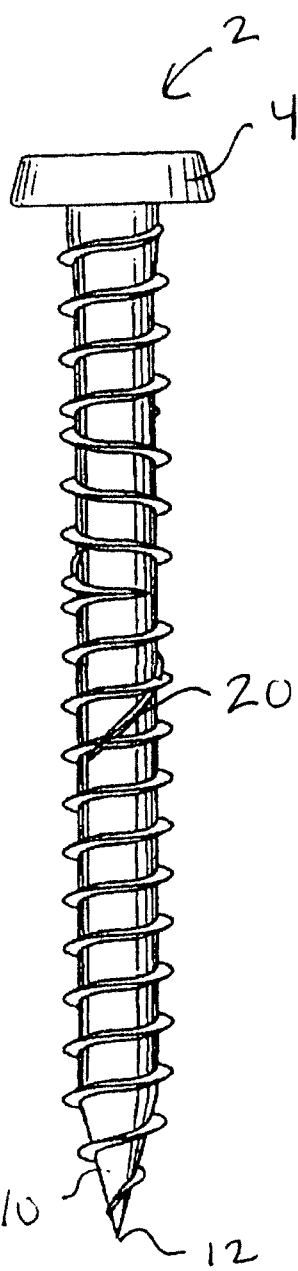
FIG. 5 is a right side elevation view thereof.
Figure 6:
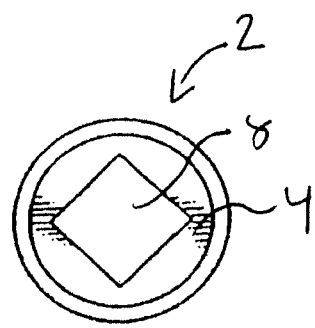
FIG. 6 is a top plan view thereof.
Figure 7:
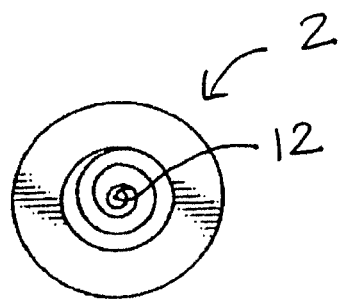
FIG. 7 is a bottom plan view thereof.
Figure 8:
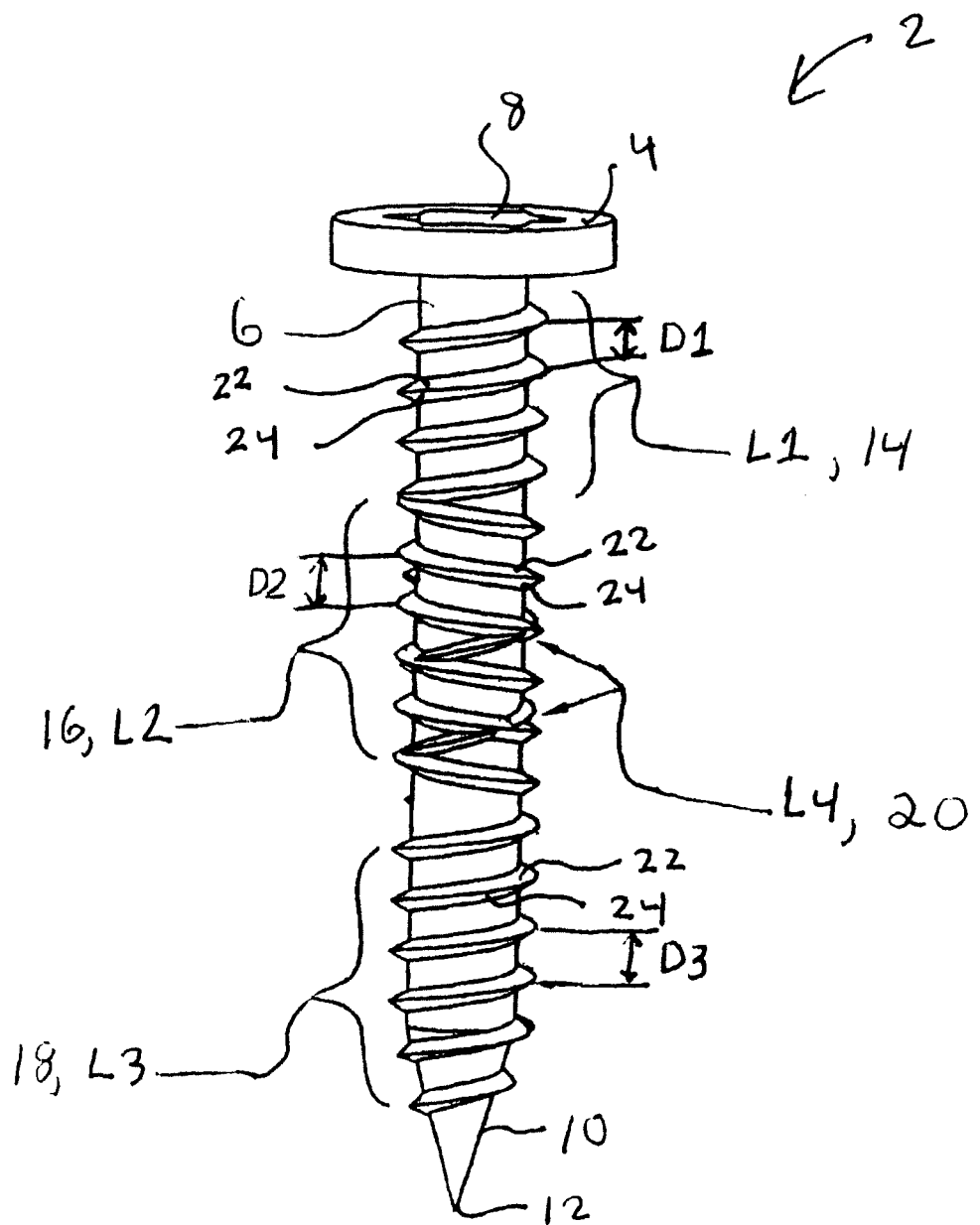
FIG. 8 is a second perspective view thereof.

Referring to FIGS. 1 through 8, and with specificity to FIG. 8, screw 2 includes head 4 on one end of shaft 6. Head 4 has a greater width than shaft 4 and preferably has disposed therein recess 8 sized and shaped to removable mate with a screw fastening tool, such as for example, a screwdriver, drill or gun (not shown).

Tip 10 is located on the opposite end of shaft 6 from shaft 4. Tip 10 is a tapering member integral with shaft 4 and terminating in point 12 to penetrate the surface of the material (e.g. wood, plastic, composite or the like) to which screw is to be secured.

On shaft 6 are preferably four different thread sections, namely first right hand thread section 14, left hand thread section 16, second right hand thread section 18 and helical ridge 20. All of first right hand thread section 14, left hand thread section 16, second right hand thread section 18 and helical ridge 20 are each preferably comprised of two abutting, convergent helical surfaces 22, 24 to form the thread section 14, 16 and 18, or helical ridge 20.

Still referring to FIG. 8, first right hand thread section 14 and second right hand thread section 18 preferably have the same right hand thread pitch, D1 and D3, respectively. Most preferably, left hand thread section 18 has a left hand thread pitch, D3, complementary to thread pitch D1 and D2. Preferably, the combined diameter of both first right hand thread section 14 and shaft 6 (i.e. the thread major diameter) as well as the combined diameter (i.e. thread major diameter) of second right hand thread portion 18 and shaft 6 are equal. Most preferably, the combined diameter (i.e. thread major diameter) of left hand thread section 16 and shaft is also equal to the above two discussed diameters. The equivalency of the aforesaid major diameters regarding, preferably, first right hand thread section 14 and second right hand thread section 18 and, most preferably, left hand thread section 16 provide uniform holding power along the entire length of shaft 6 as opposed to prior art screws with a varying major diameter along the shaft. First hand thread section 14 preferably is comprised of three threads (at L1 of FIG. 8) left hand thread section 16 is preferably comprised of five threads (at L2 of FIG. 8) and the second right hand section 18 is preferably comprised of eleven threads (at L3 of FIG. 8). Spiral ridge 22, having a right hand thread pitch, preferably interests with three of the five threads of left hand thread section 16 (L4 of FIG. 8).

Variably threaded screw 2 of the subject invention is especially useful with not only wood, but plastic and composite materials as well. More specifically, helical ridge 20 provides a torque reduction function to ameliorate "over-drilling" that commonly occurs in construction. Additionally, helical ridge 20 severs from the surface any plastic, composite or other remnant producing material, thus leaving a clean surface upon screw insertion. Furthermore, the alternating right hand and left hand thread pitches of first right hand thread section 14, left hand thread section 16 and second right hand thread section 18 reduces debris emanating from the developing screw hole by containing this debris within the screw hole as the variably threaded screw 2 is inserted.

Although the invention has been shown and described with respect to a best mode embodiment thereof, it should be understood by those skilled in the art that carious changes, omissions, and additions may be made to the form and detail of the disclosed embodiment without departing from the spirit and scope of the invention, as recited in the following claims.

I claim:

1. A screw comprising:
a shaft having a first end and a second end, said first end of said shaft terminating in a tip;
a widened head on said second end of said shaft;
a first helical thread portion on said shaft adjacent said widened head;
a second helical thread portion on said shaft adjacent said tip of said shaft;
a third helical thread portion on said shaft between said first helical thread portion and said second helical thread portion;
said first helical thread portion and said second helical thread portion having substantially the same right hand thread pitch; and
said third helical thread portion having a left hand thread pitch complementary to the right hand thread pitch.

2. The screw of claim 1 wherein said first helical thread portion, second helical thread portion and said third helical thread portion have substantially the same combined thread and shaft diameter excluding said tip.

3. The screw of claim 1 wherein said first helical thread portion is comprised of three threads.

4. The screw of claim 1 wherein said second helical thread portion is comprised of eleven threads.

5. The screw of claim 1 wherein said third helical thread portion is comprised of five threads.

6. The screw of claim 1 wherein said screw includes a helical ridge on said shaft intersecting three threads of said third helical thread portion.

7. A screw comprising:
a shaft having a first end and a second end, said first end of said shaft terminating in a tip;
a widened head on said second end of said shaft;
a first helical thread portion on said shaft adjacent said widened head;
a second helical thread portion on said shaft adjacent said tip of said shaft, the second helical thread portion not overlapping the first helical thread portion;
a third helical thread portion on said shaft between said first helical thread portion and said second helical thread portion, the third helical thread portion not overlapping the first or second helical thread portion;
said first helical thread portion and said second helical thread portion having substantially the same combined thread and shaft diameter excluding said tip;
said first helical thread portion and said second helical thread portion having right hand thread pitches;
said third helical thread portion having a left hand thread pitch complementary to the right hand thread pitch and angled substantially opposite from the right hand thread pitch.

8. The screw of claim 7 wherein said first helical thread portion and said second helical thread portion have substantially the same right hand thread pitch.

9. The screw of claim 7 wherein said first helical thread portion, second helical thread portion and said third helical thread portion have substantially the same combined thread and shaft diameter excluding said tip.

10. The screw of claim 7 wherein said first helical thread portion is comprised of three threads.

11. The screw of claim 7 wherein said second helical thread portion is comprised of eleven threads.

12. The screw of claim 7 wherein said third helical thread portion is comprised of five threads.

13. The screw of claim 7 wherein said screw includes a helical ridge on said shaft intersecting three threads of said helical thread portion.

14. A screw comprising:
a shaft having a first end and a second end, said first end of said shaft terminating in a tip;
a widened head on said second end of said shaft;
a first helical thread portion on said shaft adjacent said widened head;
a second helical thread portion on said shaft adjacent said tip of said shaft;
a third helical thread portion on said shaft between said first helical thread portion and said second helical thread portion;
said first helical thread portion, said second helical thread portion, and said third helical thread portion having substantially the same combined thread and shaft diameter excluding said tip;
said fist helical thread portion and said second helical thread portion having substantially the same right hand thread pitch;
said third helical thread portion having a left hand thread pitch complementary to the right hand thread pitch and angled substantially opposite therefrom.

15. The screw of claim 14 wherein said first helical thread portion is comprised of three threads.

16. The screw of claim 14 wherein said second helical thread portion is comprised of eleven threads.

17. The screw of claim 14 wherein said third helical thread portion is comprised of five threads.

18. The screw of claim 14 wherein said screw includes a helical ridge on said shaft intersecting three threads of said helical thread portion.

* * * * *